United States Patent

Summerlin

[15] 3,645,125
[45] Feb. 29, 1972

[54] LOCKBOLT SWAGING APPARATUS

[72] Inventor: Frederick A. Summerlin, Harpenden, England

[73] Assignee: Avdel Limited

[22] Filed: June 23, 1969

[21] Appl. No.: 835,649

[30] Foreign Application Priority Data

July 2, 1968 Great Britain...................31,632/68

[52] U.S. Cl..............................................72/391, 29/517
[51] Int. Cl.............................................B21d 9/05
[58] Field of Search...............72/391, 467, 367, 377; 29/517, 29/520, 526, 508, 243.53, 243.54, 243; 85/72, 7

[56] References Cited

UNITED STATES PATENTS 2,531,048  11/1950  Huck.........................................29/520
3,173,287  3/1965  Jenkins.....................................72/467
3,203,300  8/1965  Marschner.................................85/7
3,367,228  2/1968  King.........................................29/517

Primary Examiner—Charles W. Lanham
Assistant Examiner—Gene P. Crosby
Attorney—Kemon, Palmer & Estabrook

[57] ABSTRACT

The nosepiece of a tool for swaging the collars of swaged collar-type lock bolts has an anvil with a throat which is provided at its inner end with a radially inwardly projecting annular shoulder. This shoulder prevents a fully swaged collar entering completely into the throat. The annular shoulder also supports the axial thrust of the swaged collar on the nosepiece of the tool. The nosepiece can be used to place ordinary lock bolts in soft sheets which would not be strong enough to support the compression which would be developed between the swaged collar and the head of the lock bolt, when placed with a nosepiece not having the shoulder.

3 Claims, 5 Drawing Figures

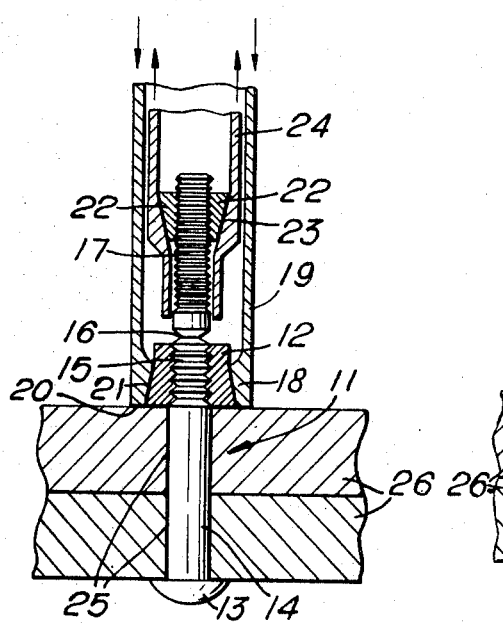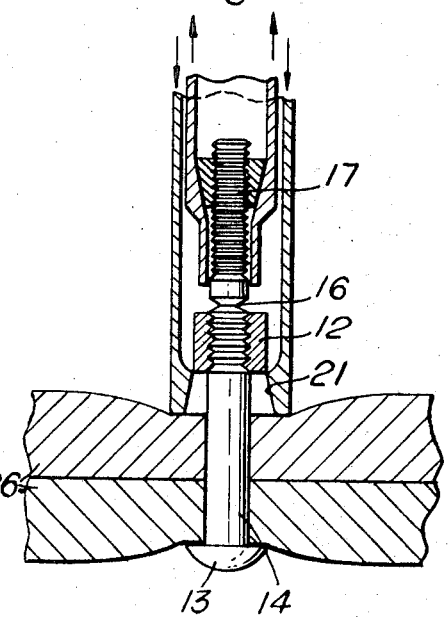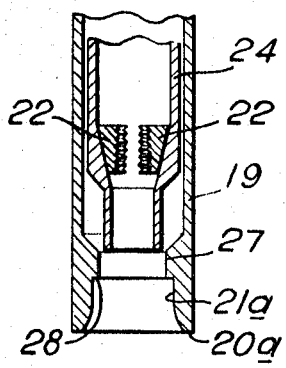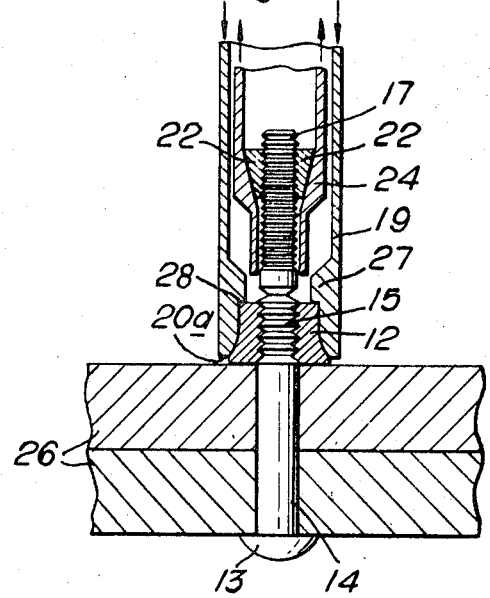

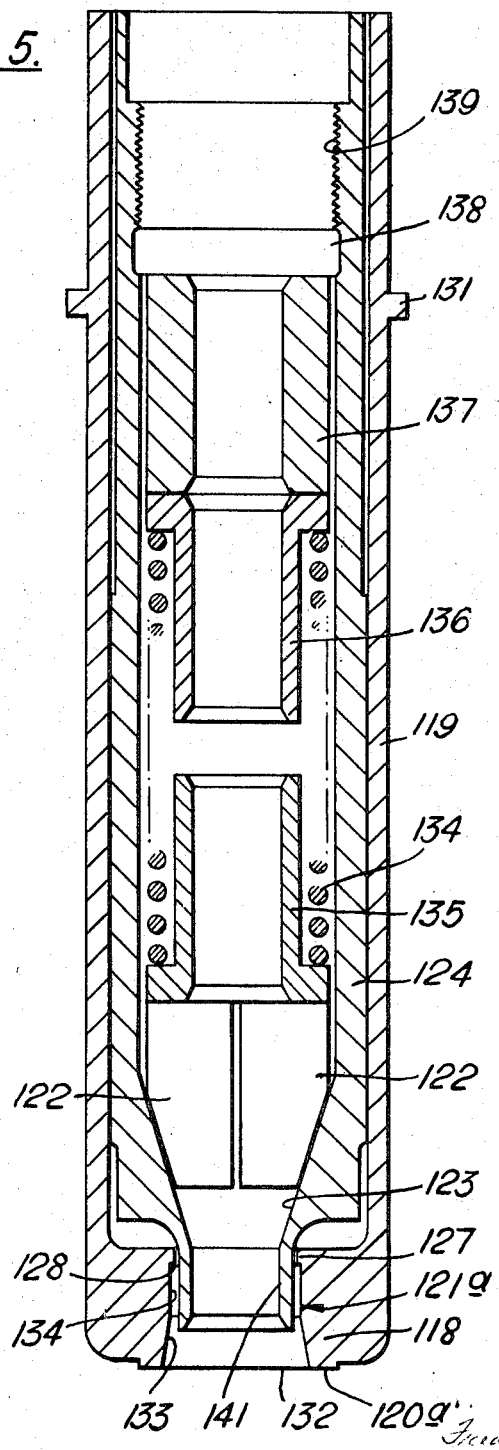

LOCKBOLT SWAGING APPARATUS

The invention relates to lock bolt swaging apparatus, and more particularly to an improved anvil for use in lock bolt-swaging apparatus.

By "lock bolt" is meant a fastener of the type comprising a pin with a head at one end and one or more locking grooves on the stem of the pin at a position spaced from the head, and a collar which fits over the stem of the pin and which, in use of the fastener, is swaged into the aforesaid locking groove or grooves to lock it to the pin.

Such lock bolts are usually placed or set by means of a swaging tool which comprises gripping means (e.g., a pair of jaws) which grip a portion of the stem extending beyond the locking groove(s) of the pin, and an annular anvil with a throat which receives the collar. The pin is placed through aligned apertures in workpieces to be joined together with the head adjacent one face of the workpieces, and the collar is placed over locking grooves on the part of the pin stem projecting from the other side of the workpieces so that the collar is adjacent the other face of the latter. The swaging tool is then offered up to the projecting part of the pin stem so that the gripping portion of the stem goes through the aperture in the annular anvil and is gripped by the gripping means, whilst the anvil receives and rests against the collar. The tool is then operated (e.g., by hydraulic power) to retract the gripping means with respect to the anvil. The head of the pin is pulled hard against one face of the workpieces and the collar is pushed hard against the other face by the anvil. This push on the anvil increases until the collar deforms and the anvil passes over the collar and swages the collar into the locking groove(s) on the pin stem.

Such lock bolts and lock bolt-swaging apparatus are well known and are well understood by those skilled in the art of industrial fasteners.

The invention provides an anvil for use in lock bolt-swaging apparatus, which anvil has a throat for receiving the collar of a lock bolt and swaging the collar to the pin of the lock bolt, which throat has an abutment spaced away from its mouth for preventing the fully swaged collar from entering completely into the throat.

The present invention also provides the combination of a lock bolt collar and an anvil for use in swaging the collar, the anvil having a throat for receiving and swaging the collar, the throat having an abutment spaced from its mouth and past which abutment the swaged collar cannot pass, such that when the collar is fully swaged and one end of it is engaging the abutment the opposite end of the swaged collar protrudes beyond the mouth of the anvil throat.

Preferably the abutment is in the form of an annular shoulder projecting into the throat.

The invention includes lock bolt-swaging apparatus incorporating an anvil as aforesaid.

A specific embodiment of the invention will now be described by way of example and with reference to the accompanying drawings which are all cross sections through the anvil and adjacent parts of a lock bolt placing tool including (with the exception of FIGS. 3 and 5) a lock bolt (not shown in section) in the fully placed condition in workpieces. FIGS. 1 to 4 inclusive are somewhat simplified for the purpose of illustrating the differences between the present invention and the prior art. In the drawings:

FIG. 1 shows a lock bolt in sheets of normal strength placed with a tool with a conventional prior-art anvil;

FIG. 2 shows a similar lock bolt placed by the same tool in soft sheets which have deformed;

FIG. 3 shows part of a tool with an anvil according to the present invention;

FIG. 4 shows a lock bolt (similar to those of FIGS. 1 and 2) placed in soft sheets with the tool of FIG. 3; and FIG. 5 shows the present invention put into practice in the nosepiece of a tool.

The lock bolts shown in FIGS. 1, 2 and 4 are of a well-known type and each comprises a pin 11 and a collar 12. The pin 11 comprises a stem having a head 13 at one end. Adjacent the head the stem has a length 14 of plain exterior, and then a plurality of circumferential swaging grooves 15. Beyond the swaging grooves is a breaker groove 16, and beyond that a plurality of circumferential gripping grooves 17.

The known type of swaging tool illustrated in part in FIGS. 1 and 2 has an annular anvil 18 formed at the end of an outer tube 19 secured to the head member of a hydraulic tool. The anvil has an annular end face 20 and a throat 21 of tapering form, as illustrated in FIGS. 1 and 2. The annular face 20 surrounds the outer end or mouth of the throat. The gripping means comprises a pair of collet jaws 22, the inner faces being serrated to engage with the grooves 17 on the bolt stem and the outer faces being tapered and received within the tapering inner walls 23 at the end of an inner tube 24 secured to the pulling member of the hydraulic tool. (The conventional spring and backup behind the jaws are not illustrated in FIGS. 1 to 4). In use, the pin is inserted through aligned apertures 25 in sheets 26 of metal to be fastened together and the collar 12 (in its undeformed state it is substantially cylindrical with a slightly enlarged and chamfered end which is received by the mouth end of the anvil throat) is placed over the locking grooves 15 on the projecting part of the stem. The tool is then offered up to the stem so that the end of the stem enters between the jaws 22 and is gripped by them, and the outermost end of the anvil throat 21 adjacent its mouth contacts the end of the collar. The hydraulic tool is now actuated, retracting the inner tube 24 relative to the outer tube 19 (as indicated by the arrows in FIGS. 1, 2 and 4). The jaws 22 pull the pin so that the head 13 is pressed tightly against one face of the workpieces and the collar 12 is pushed tightly against the other face of the workpieces. The sheets 26 support this compression, and as the inward pull on the jaws 22 with respect to the anvil increases, the consequent increasing compression on the collar between the face of the sheets at one end and the tapering anvil throat at the other end causes the collar to deform. The tapered anvil throat passes down over the outside of the collar swaging it inwardly into the locking grooves 15 on the stem.

When the end face 20 of the anvil reaches the face of the workpieces it stops since the sheets support the compression between the head 13 of the bolt stem and the face 20 of the anvil, which continues to increase due to the action of the hydraulic tool. No further deformation of the collar occurs. This is the position illustrated in FIG. 1. The tension on the bolt stem then increases still further until the stem breaks at the breaker groove 16.

Such a lock bolt and method of placing it with a swaging tool as have been described above are well known to those skilled in the art.

It will be noted the successful operation of such a system requires that the sheets being secured by the bolt can withstand a compression load across them (between the anvil face 20 and the bolthead 13) which is at least equal to the breaking load of the stem (at which the breaker groove 16 fractures) less any resistance to extrusion through the anvil throat offered by the swaged collar 12. This resistance is relatively small. This means that soft sheets cannot be secured by this system, since the malfunction illustrated in FIG. 2 then occurs. It will be seen that, although the stem has not yet fractured at the breaker groove 16, the sheets have collapsed under the compression between the anvil face 20 and the bolthead 13 and have allowed the pin to be drawn further into the anvil, the collar 12 being extruded or die drawn through the inner, narrow end of the anvil throat 21.

An anvil according to the present invention, which overcomes the above-described disadvantages, is illustrated in FIG. 3. Compared with the conventional placing apparatus illustrated in FIG. 1, the anvil throat illustrated in FIG. 3 is elongated. Although the shape of the throat 21a of this anvil is substantially similar to that of the anvil of FIG. 1, this anvil has at its inner, narrow end an inwardly projecting shoulder 27 which provides an annular face 28 facing the mouth of the anvil. This provides an abutment in the anvil throat which positively prevents the collar passing any further into the anvil throat. FIG. 4 illustrates the fully swaged position of the collar i.e., just before the breaker groove fracture) when the bolt is being secured in soft sheets similar to those illustrated in FIG. 2. It will be noted that, as mentioned, the annular shoulder 27 prevents the swaged collar 12 from entering completely within the anvil throat. That is to say, the distance between the annular face 28 of the shoulder and the end face 20a of the anvil is chosen to be slightly less than the axial length of the fully swaged collar 12, as illustrated in FIG. 4. Thus the end face 20a of the anvil cannot reach the face of the workpieces. The collar 12 is securely swaged on to the locking grooves 15 of the bolt stem. The thrust of the outer tube 19 of the swaging tool is taken through the annular face 28 of the anvil shoulder 27 and the end face of the swaged collar 12, and thus directly through the bolt to the jaws 22 to the inner tube 24. Thus, once the end of the swaged collar has met the annular face 28 of the shoulder 27 of the anvil, the compression across the sheets cannot further increase as it can with the arrangement illustrated in FIGS. 1 and 2.

FIG. 5 illustrates a practical embodiment of the present invention in the form of a nosepiece for a hydraulically operated lock bolt-swaging tool. (In FIG. 5, parts corresponding to those in FIGS. 3 and 4 are given corresponding reference numerals but raised by 100, for ease of comparison without confusion.) The nosepiece comprises an outer tube 119 having an annular anvil 118 formed integrally therewith at one end. The other end of the nosepiece is adapted to be connected to the hydraulic tool. The outer tube has near the end remote from the anvil an outwardly projecting flange 131 which takes the axial thrust between the outer tube and the tool body. The anvil 118 has an annular end face 120a which projects slightly beyond the surrounding part of the bottom end of the outer tube and itself surrounds the mouth 132 of the throat 121a of the anvil. The throat 121a consists of two contiguous portions, a tapered portion 133 adjacent the mouth and a cylindrical portion 134 remote from the mouth. At the inner end of the cylindrical portion 133 is an annular shoulder 127 having an annular face 128 towards the mount of the throat. The lowermost end of the inner tube 124 is formed as a pushoff nose 141, which projects into the throat 121a to push the anvil off the fully swaged collar on the return stroke of the hydraulic tool. The nosepiece also comprises an inner tube 124 having tapering inner walls 123 at its end adjacent the anvil. Serrated jaws 122 (shown in outside elevation in FIG. 5) are pushed into the tapered walls by a helical compression spring 134 acting through a backup member and spring guide 135. The outer end of the spring abuts against a second spring guide 136 which is in turn held by a spacer 137 against a circlip 138 inside the inner tube 124. Above the circlip 138 the inner tube 124 is threaded at 139 for attachment to the drawbar of the hydraulic tool.

It will be appreciated that it is possible, by means of a swaging tool incorporating an anvil such as illustrated in FIG. 5, to place conventional lock bolts, with a tool which is otherwise (i.e. apart from the anvil) also conventional, in much softer sheets than has previously been possible. This is clearly advantageous in practice.

The invention is not restricted to the details of the foregoing example. For instance, the precise design of the abutment in the anvil throat may be different to that illustrated in FIG. 5. It should be noted that the narrowest part of the anvil throat inside the shoulder should, in the type of tool illustrated in the foregoing example, be large enough to allow the pushoff nose of the inner tube to pass through to push the anvil off the swaged collar.

I claim:

1. An open-ended tubular anvil for use in lock bolt-swaging apparatus for swaging a collar of a lock bolt to a pin of said lock bolt, which swaging apparatus includes means for supporting a tubular anvil and means for gripping an end of a lock bolt pin inserted through a tubular anvil supported by the supporting means, said open-ended tubular anvil having a throat for receiving a collar of a lock bolt, said throat having a mount at one end and an annular shoulder at the other end remote from the mouth, which shoulder extends radially inwardly of the throat; said shoulder having an annular face which face lies in one flat plane perpendicular to the length of the throat and which face faces towards the said mouth of the throat for engaging an end of said collar and limiting the movement of said collar 2. An open-ended tubular anvil for use in lock bolt-swaging apparatus for swaging a collar of a lock bolt to a pin of said lock bolt, which swaging apparatus includes means for supporting a tubular anvil and means for gripping an end of a lock bolt pin inserted through a tubular anvil supported by the supporting means, said open-ended tubular anvil having a throat for receiving a collar of a lock bolt, said throat having a generally cylindrical symmetry about a longitudinal axis, said throat having a mouth at one end and an annular shoulder at the other end remote from the mouth and extending radially inwardly of the throat, said shoulder having an annular face which lies in one flat plane perpendicular to the said longitudinal axis of the throat and which face faces towards said mouth of the throat for engaging an end of said collar and limiting the movement of said collar in said throat.

3. An open-ended anvil for use in a lock bolt-swaging apparatus as set forth in claim 1 wherein said collar when swaged upon said pin is of a length greater than the distance between the shoulder and the mouth of said anvil.

* * * * *

UNITED STATES PATENT OFFICE
CERTIFICATE OF CORRECTION

Patent No. 3,645,125   Dated February 29, 1971

Inventor(s) Frederick A. Summerlin

It is certified that error appears in the above-identified patent and that said Letters Patent are hereby corrected as shown below:

(73) Assignee Aerpat A. G. by Mesne Assignment

In the Claim:

Column 4, line 24 "mount" should read --mouth--.

Signed and sealed this 8th day of August 1972.

(SEAL)
Attest:

EDWARD M. FLETCHER, JR.        ROBERT GOTTSCHALK
Attesting Officer              Commissioner of Patents